No. 12,066. Reissued Dec. 23, 1902.

J. J. & A. SCHIER.

PACKING GASKET.

(Application filed Sept. 8, 1902.)

Witnesses:

Geo W Young

N. E. Oliphant

Inventors:

Joseph J. Schier

Adolph Schier

By H. G. Underwood

Attorney

UNITED STATES PATENT OFFICE.

JOSEPH J. SCHIER AND ADOLPH SCHIER, OF MILWAUKEE, WISCONSIN.

PACKING-GASKET.

SPECIFICATION forming part of Reissued Letters Patent No. 12,066, dated December 23, 1902.

Original No. 697,546, dated April 15, 1902. Application for reissue filed September 8, 1902. Serial No. 122,642.

*To all whom it may concern:*

Be it known that we, JOSEPH J. SCHIER and ADOLPH SCHIER, citizens of the United States, and residents of Milwaukee, in the county of Milwaukee and State of Wisconsin, have invented certain new and useful Improvements in Packing-Gaskets; and we do hereby declare that the following is a full, clear, and exact description thereof.

Our invention has for its object to provide simple, economical, non-separable, and durable packing-gaskets of the species in which a ring of compressible soft metal or metallic composition is combined with a harder-metal retaining-ring; and it consists in such a gasket having the rings thereof in crimped tongue-and-groove union and in structural peculiarity of said rings, as hereinafter more particularly set forth with reference to the accompanying drawings and subsequently claimed.

Figure 2:
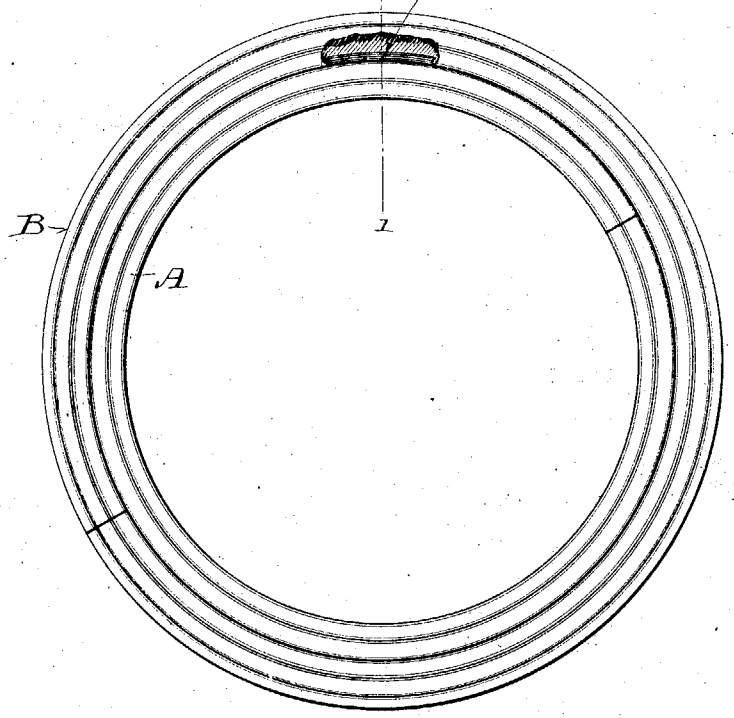
Figure 1:
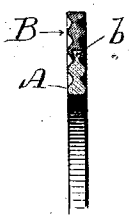

Figure 1 of the drawings represents a transverse section view of a portion of a packing-gasket in accordance with our invention, the plane of the section being indicated by line 1 1 in the second figure; and Fig. 2, a plan view of the gasket, partly broken.

Referring by letter to the drawings, A indicates a ring of compressible soft metal or metallic composition, and B a harder-metal retaining-ring for the one aforesaid, the two rings being in crimped tongue-and-groove union, crimping of the joint serving to prevent the softer ring from slipping out of connection with the harder one.

The ring B is preferably copper and is shown in the drawings as provided with an inner annular groove engaged by an outer tongue *b* of the softer ring A, (it being immaterial which of the two rings has the groove and which the tongue,) the crimping of the joint to lock the tongue in the groove being done after the two rings are put together. The rings are preferably bent into shape from straight strips of material, the ends of each being joined by solder, soldering of the inner ring being done after its union with the outer one is effected, both rings being herein shown flat and transversely corrugated the same on both sides—that is to say, the ridges of one side are opposite those of the other side instead of alternate, and the depressions or grooves are likewise, as shown in Fig. 1. This peculiar corrugating or grooving is essential in the copper or hard ring, but only preferably so in the other softer ring.

By having the rings united as herein set forth the cost of production is cheapened and the most satisfactory results attained, it being impossible for the two rings to become separated at any point of the circle without tearing. Hence the softer ring cannot be shaken or bent out of place, and the peculiar corrugating or grooving of said rings, especially the harder one, makes the gasket sufficiently stiff to withstand pressure in a joint that would ordinarily flatten out said harder ring were the same corrugated to have the ridges on one side alternate with those on the other.

Having thus described our invention, what we claim as new, and desire to secure by Letters Patent, is—

1. A packing-gasket consisting of a ring of compressible soft metal or metallic composition and a harder metallic ring in crimped tongue-and-groove connection one within the other.

2. A packing-gasket consisting of a ring of compressible soft metal or metallic composition together with a harder metallic ring, one of said rings having an annular tongue and the other ring being provided with an annular groove in which the said annular tongue is crimped.

3. A packing-gasket consisting of a ring of compressible soft metal or metallic composition, together with a harder metallic ring corrugated or grooved on both sides alike to have the ridges of one side opposite those of the other side and the depressions likewise.

4. A packing-gasket consisting of a ring of compressible soft metal or metallic composition, and a harder metallic ring in connection with the other each corrugated or grooved on both sides alike to have the ridges of one side opposite those of the other side and the depressions likewise.

5. A packing-gasket consisting of a ring of compressible soft metal or metallic composition and a harder metallic ring in crimped tongue-and-groove connection one within the other and corrugated on both sides alike to have the ridges of one side opposite those of the other side and the depressions likewise.

In testimony that we claim the foregoing we have hereunto set our hands, at Milwaukee, in the county of Milwaukee and State of Wisconsin, in the presence of two witnesses.

JOSEPH J. SCHIER.
ADOLPH SCHIER.

Witnesses:
H. G. UNDERWOOD,
GEO. W. YOUNG.